United States Patent
Okada

(10) Patent No.: US 9,321,670 B2
(45) Date of Patent: Apr. 26, 2016

(54) OPTICAL FIBER PREFORM AND METHOD OF MANUFACTURING OPTICAL FIBER USING OPTICAL FIBER PREFORM

(71) Applicant: FUJIKURA LTD., Kohtoh-ku, Tokyo (JP)

(72) Inventor: Kenji Okada, Sakura (JP)

(73) Assignee: FUJIKURA LTD., Tokyo (JP)

( * ) Notice: Subject to any disclaimer, the term of this patent is extended or adjusted under 35 U.S.C. 154(b) by 221 days.

(21) Appl. No.: 13/669,682

(22) Filed: Nov. 6, 2012

(65) Prior Publication Data
US 2013/0061637 A1 Mar. 14, 2013

Related U.S. Application Data

(63) Continuation of application No. PCT/JP2011/061420, filed on May 18, 2011.

(30) Foreign Application Priority Data

May 21, 2010 (JP) ................................. 2010-117374

(51) Int. Cl.
*C03B 37/027* (2006.01)
*C03B 37/012* (2006.01)

(52) U.S. Cl.
CPC .......... *C03B 37/027* (2013.01); *C03B 37/01211* (2013.01); *C03B 37/01251* (2013.01); *C03B 37/02772* (2013.01); *C03B 2205/12* (2013.01); *C03B 2205/40* (2013.01); *C03B 2205/45* (2013.01); *Y02P 40/57* (2015.11)

(58) Field of Classification Search
CPC .................. C03B 37/01211; C03B 37/01251; C03B 37/02772; C03B 37/27; C03B 37/1205; C03B 37/01242; C03B 37/025; C03B 2205/40; C03B 2205/44; C03B 2205/47
USPC ............................................................ 65/435
See application file for complete search history.

(56) References Cited

U.S. PATENT DOCUMENTS

| 5,674,306 A * | 10/1997 | Hoshino et al. | 65/385 |
| 6,779,363 B1 * | 8/2004 | Craft et al. | 65/384 |
| 2003/0024272 A1 * | 2/2003 | Naka et al. | 65/379 |
| 2007/0245773 A1 | 10/2007 | Peekhaus et al. | |

FOREIGN PATENT DOCUMENTS

| JP | 2004-43201 A | 2/2004 |
| JP | 2006-27924 A | 2/2006 |
| JP | 2008-509874 A | 4/2008 |

OTHER PUBLICATIONS

International Search Report for PCT/JP2011/061420 dated Aug. 23, 2011.

* cited by examiner

*Primary Examiner* — Queenie Dehghan
(74) *Attorney, Agent, or Firm* — Sughrue Mion, PLLC

(57) ABSTRACT

An optical fiber preform that is used in a method in which a core rod that forms a core is inserted into a quartz tube that forms a cladding, and at the same time as they are fiber-drawn, the quartz tube and the core rod are formed into a single body, includes: a tapered portion that is formed by grinding an outer circumferential portion of a distal end portion of the quartz tube into a tapered shape; and a conical portion that is formed by welding a dummy tube that has substantially the same outer diameter as the outer diameter of a distal end portion of the tapered portion to the distal end portion of the tapered portion, and by applying heat to the dummy tube and stretching out the dummy tube, where the core rod is inserted inside the quartz tube.

1 Claim, 3 Drawing Sheets

OPTICAL FIBER PREFORM AND METHOD OF MANUFACTURING OPTICAL FIBER USING OPTICAL FIBER PREFORM

CROSS REFERENCE TO RELATED APPLICATIONS

This application is a continuation application based on a PCT Patent Application No. PCT/JP2011/061420, filed May 18, 2011, whose priority is claimed on Japanese Patent Application No. 2010-117374, filed May 21, 2010, the entire content of which are hereby incorporated by reference.

BACKGROUND OF THE INVENTION

1. Field of the Invention

The present invention relates to an optical fiber preform and to a method of manufacturing an optical fiber using the optical fiber preform.

2. Description of the Related Art

One method of manufacturing an optical fiber is known as an Online-Rod in Cylinder method. In this method, a core rod that either forms a core or forms a core and a portion of the cladding is inserted inside an internal space in a quartz tube that forms a cladding. When this is drawn into a fiber, at the same time as the fiber drawing is taking place, the quartz tube and the core rod are fused together into a single body so as to manufacture a bare optical fiber. A coating layer is then provided on the bare optical fiber so as to form an optical fiber.

In this Online-Rod in Cylinder method, the shape of the distal end portion of the optical fiber preform that is formed by the quartz tube and the core rod which is inserted inside the quartz tube is crucial from the standpoints of the workability of the fiber-drawing operation, manufacturability, the property stabilization of the optical fiber, cost, and the like.

In Japanese Unexamined Patent Application, First Publication No. 2004-43201, a method for manufacturing the optical fiber preform that is used in this Online-Rod in Cylinder method is disclosed in which heat is applied to the distal end portion of the quartz tube so as to seal it off in a tapered shape, and heat is also applied in the same way to the distal end portion of the core rod so as to also form the portion in a tapered shape. Next, the core rod is inserted inside the quartz tube so as to form an optical fiber preform.

In Japanese Unexamined Patent Application, First Publication No. 2006-27924, a method is disclosed in which, after the core rod has been inserted inside the quartz tube, heat is applied to the distal end portion thereof so as to form a distal end tapered portion, and thereby form an optical fiber preform.

However, in these conventional technologies, because either the quartz tube and the core rod are heated separately, or else the joint object formed by combining the quartz tube and the core rod is heated, a component having a large thermal capacity must be heated, so that the time required for this heating is prolonged to several hours or more.

In recent times, the size of the optical fiber preform is increasing, so that the sizes of the quartz tube and core rod are also increasing, and thus, the heating time requires much longer time.

SUMMARY

It is an object of the present invention to efficiently obtain in a short working time, an optical fiber preform that is suitable for manufacturing an optical fiber using an Online-Rod in Cylinder method. It is a further object of the present invention to provide a manufacturing method that is suitable for manufacturing an optical fiber that employs this optical fiber preform.

In order to achieve the above-described objects, the present invention employs the following structure.

The optical fiber preform according to a first aspect of the present invention is an optical fiber preform that is used in a method in which a core rod that forms a core is inserted into a quartz tube that forms a cladding, and at the same time as they are fiber-drawn, the quartz tube and the core rod are formed into a single body, and that includes: a tapered portion that is formed by grinding an outer circumferential portion of a distal end portion of the quartz tube into a tapered shape; and a conical portion that is formed by welding a dummy tube that has substantially the same outer diameter as the outer diameter of a distal end portion of the tapered portion to the distal end portion of the tapered portion, and by applying heat to the dummy tube and stretching out the dummy tube, wherein the core rod is inserted inside the quartz tube.

In the optical fiber preform according to the above-described first aspect of the present invention, it is also possible for a difference between the outer diameter of the dummy tube and the outer diameter of the distal end portion of the tapered portion to be from 0 mm to 5 mm.

A method of manufacturing an optical fiber according to a second aspect of the present invention is a method of manufacturing an optical fiber in which fiber drawing is performed using the optical fiber preform according to the above-described first aspect of the present invention, the method including: starting the fiber drawing by placing a distal end of a conical portion of the optical fiber preform in a central position in a vertical direction of a heater of a heating furnace of a fiber-drawing apparatus; and at the same time as the fiber drawing is started, lowering the optical fiber preform and accelerating the fiber-drawing speed; once a weld portion where a quartz tube is welded to a dummy tube has reached the vicinity of the central position of the heater, suspending the lowering; continuing the fiber drawing while the speed is accelerated at the same acceleration rate even while the lowering of the optical fiber preform is suspended; after the fiber drawing is continued until the outer diameter of the bare optical fiber grows to 10 to 20% thicker with respect to a target outer diameter, temporarily lifting up the optical fiber preform; when the outer diameter of the bare optical fiber reaches the target outer diameter by adjusting the outer diameter so as to be narrower, resuming the lowering of the optical fiber preform; and accelerating the fiber drawing speed until the fiber drawing speed reaches a set line speed.

According to the optical fiber preform of the first aspect of the above-described present invention, because the grinding of the outer circumferential portion of a quartz tube can be achieved mechanically, the task can be achieved in a short time.

Moreover, there is no need to apply heat to the entire circumference of a quartz tube having a large diameter and wall-thickness and a large heat capacity, and heat is only applied during the formation of the conical portion of a narrow-diameter dummy tube. As a consequence, the heating time required for this work is markedly shortened compared to the conventional technology.

Furthermore, because a mechanical grinding method is used for the working of the tapered portion of the quartz tube, it is possible to shorten the length in the tube axial direction of the tapered portion. As a consequence, the unusable portion of the quartz tube (i.e., the tapered portion) is reduced, and thus, the yield improves.

According to the method of manufacturing an optical fiber of the second aspect of the above-described present invention, superior fiber drawing is possible even when an optical fiber preform that has a portion where the heat capacities of the quartz tube and the dummy tube are mutually different is used for the optical fiber preform. In addition, the time required from when the fiber-drawing task is started until a stationary state is achieved is shortened, and the unusable fiber-drawing portion that cannot be utilized as a product is reduced.

DETAILED DESCRIPTION OF THE PREFERRED EMBODIMENTS

FIGS. 1A to 1E are explanatory views showing the sequence of steps of a method of manufacturing an optical fiber preform according to an embodiment of this invention.

Firstly, a quartz tube 1 that will form a cladding is prepared. A quartz tube formed from a synthetic quartz of straight shape having, for example, an outer diameter of from 100 to 180 mm, an inner diameter of from 40 to 50 mm, and a length of approximately from 1000 to 3000 mm is used for this quartz tube 1.

Figure 1A:
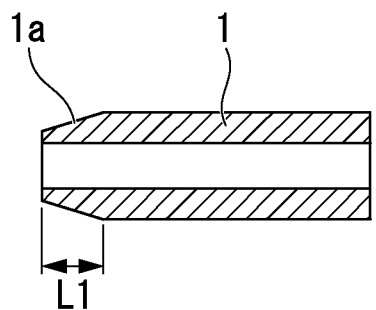
FIG. 1A is an explanatory view showing a manufacturing step for an optical fiber preform according to an embodiment of the present invention.

Next, as is shown in FIG. 1A, a tapered portion 1a is formed by mechanically grinding the outer circumferential portion at one end of this quartz tube 1 using a lathe or the like. A length L1 in the tube axial direction of the tapered portion 1a is approximately 30 to 150 mm.

Figure 1B:
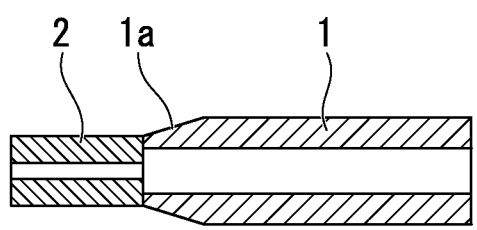
FIG. 1B is an explanatory view showing a manufacturing step for an optical fiber preform according to the same embodiment.

Next, as is shown in FIG. 1B, a dummy tube 2 is welded onto the distal end of the tapered portion 1a of the quartz tube 1. This welding may be performed using a method such as heating end portions of both tubes using a burner and then adhering them together or the like.

This dummy tube 2 is a dummy tube having a straight shape formed from synthetic quartz. The dimensions of the dummy tube are, for example, an outer diameter of from 50 to 80 mm, an inner diameter of from 20 to 50 mm, and a length of from 50 to 200 mm. Here, the outer diameter of the dummy tube 2 is most important, and if the outer diameter of the distal end of the tapered portion 1a of the quartz tube 1 is taken as D1, and the outer diameter of the dummy tube 2 is taken as D2, the outer diameter of the dummy tube 2 needs to be set such that $0 \text{ mm} \leq D2-D1 \leq 5 \text{ mm}$, and D1=D2 is more preferable.

Generally, even a slight change in the outer diameter of an optical fiber preform leads to a change in the outer diameter of the bare optical fiber. If the outer diameter D2 of the dummy tube 2 is smaller than the outer diameter D1 of the tapered portion 1a, the step portion that is formed on the weld portion does not get drawn into the fiber, and still remains as a bump. Because of this, when this portion is withdrawn, the outer diameter of the bare optical fiber becomes markedly thicker. In the worst cases, the bare optical fiber becomes blocked in the die and the like of the coating apparatus that is used to form a coating layer so that the fiber ends up breaking. On the other hand, if the outer diameter D2 of the dummy tube 2 is 5 mm or more thicker than the outer diameter D1 of the distal end portion of the tapered portion 1a, then, conversely, the bare optical fiber becomes too thin to withstand the pulling tensile force during the fiber drawing and ends up breaking.

Figure 1C:
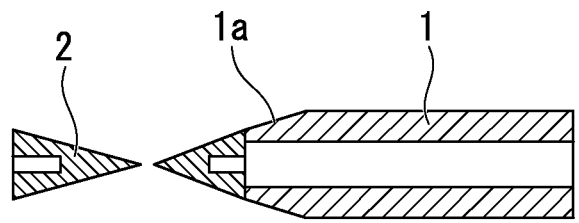
FIG. 1C is an explanatory view showing a manufacturing step for an optical fiber preform according to the same embodiment.

Next, as is shown in FIG. 1C, a portion substantially in the center in the tube axial direction of the dummy tube 2 is heated by a burner or the like, and is then stretched so that the dummy tube 2 is divided into two portions with a conical portion 2a being formed in the dummy tube 2. At this time, the area around the distal end of the conical portion 2a is solid. A length L2 in the tube axial direction of the dummy tube 2 in this state is from approximately 25 mm to approximately 100 mm.

Figure 1D:
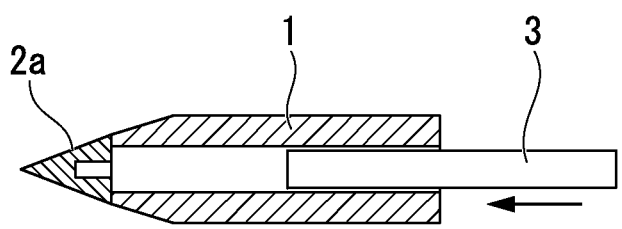
FIG. 1D is an explanatory view showing a manufacturing step for an optical fiber preform according to the same embodiment.
Figure 1E:
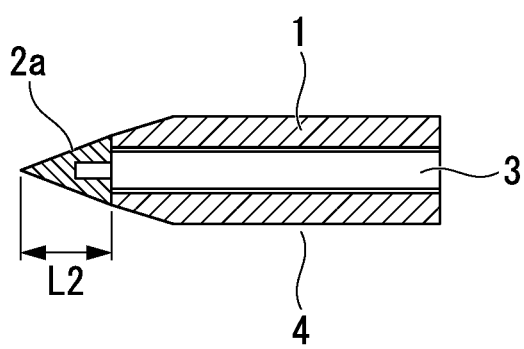
FIG. 1E is an explanatory view showing a manufacturing step for an optical fiber preform according to the same embodiment.

As is shown in FIG. 1D, a core rod 3 that either forms the core or forms the core and a portion of the cladding is inserted into the space inside the quartz tube 1 in the aforementioned state as far as the distal end thereof, so that an optical fiber preform 4 shown in FIG. 1E is obtained. A core rod having an outer diameter of from 30 to 45 mm and a length of approximately from 1000 to 3000 mm is used for the core rod 3. If this structure is employed, when the core rod 3 is inserted into the quartz tube 1, a gap of approximately 2 to 5 mm is left between the quartz tube 1 and the core rod 3. This gap is either decompressed during the fiber-drawing process, or else is used to supply an inert gas such as nitrogen or argon or the like.

In this type of optical fiber preform 4, because the grinding of the outer circumferential portion of the quartz tube 1 is performed mechanically, the task is completed in a short time. Moreover, because it is not necessary to heat the entire circumference of the quartz tube 1 which has a large diameter and wall-thickness and a large heat capacity, heat is only applied during the formation of the conical portion 2a of the narrow-diameter dummy tube 2. As a consequence, the heating time required for this process is markedly shortened compared to the conventional technology.

Furthermore, because a mechanical grinding method is used for the working of the tapered portion 1a of the quartz tube 1, it is possible to shorten the length in the tube axial direction of the tapered portion 1a. As a consequence, the unusable portion of the quartz tube 1 (i.e., the tapered portion 1a) is reduced, and thus, the yield improves.

The method of manufacturing an optical fiber according to an embodiment of the present invention is a method in which the above-described optical fiber preform 4 is used. However, because the structure of the optical fiber preform 4 is new, the method needs to be performed under appropriate fiber-drawing conditions. Namely, because the heat capacity in the tapered portion 1a of the quartz tube 1 is different from the heat capacity in the dummy tube 2, the deformation of the tapered portion 1a takes a longer time than the deformation of the dummy tube 2. This point needs to be carefully considered.

Figure 2A:
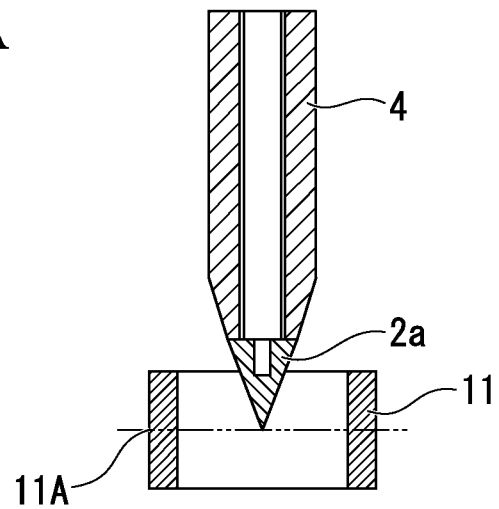
FIG. 2A is an explanatory view showing a step of a manufacturing method according to an embodiment of the present invention.

Firstly, as is shown in FIG. 2A, the distal end of the conical portion 2a of the dummy tube 2 of the optical fiber preform 4 is placed in a central position 11A in a vertical direction inside a heater 11 of a heating furnace of a fiber drawing apparatus, and the fiber drawing is then started. At the same time as the fiber drawing is started, the optical fiber preform 4 is lowered at a lowering speed of from 5 mm/min to 20 mm/min, and also the fiber-drawing speed is accelerated at an acceleration rate of from 20 m/min$^2$ to 50 m/min$^2$.

Figure 2B:
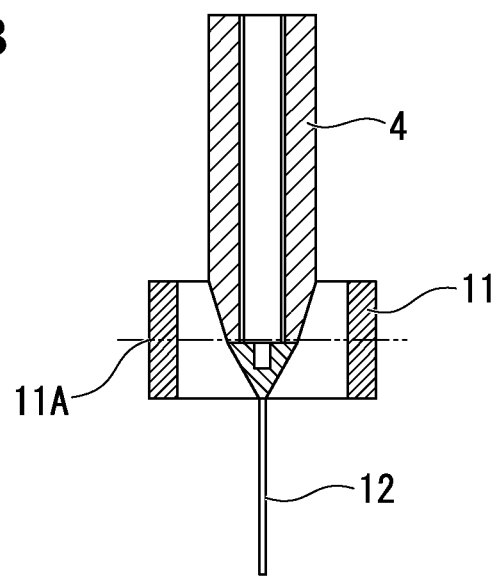
FIG. 2B is an explanatory view showing a step of a manufacturing method according to the same embodiment.

As is shown in FIG. 2B, the optical fiber preform 4 is lowered, and the lowering is suspended once the weld portion between the quartz tube 1 and the dummy tube 2 reaches the vicinity of the heater central position 11A. Here, the vicinity of the central position 11A refers to a range relative to the central position 11A of +10% to −10% of the length of the heater 11. While the lowering of the optical fiber preform 4 is suspended, the fiber drawing is still continued while the speed is accelerated at the same acceleration rate, and the outer diameter of the bare optical fiber 12 shows the acceleration trend, and this state is maintained until the bare optical fiber reaches a thickness of from 10 to 20% of a target outer diameter (125 μm).

When the outer diameter of the bare optical fiber reaches a thickness of from 10 to 20% of the target outer diameter, the optical fiber preform 4 is temporarily lifted up, and an adjustment is made such that the outer diameter of the bare optical fiber becomes thinner. When the outer diameter of the bare optical fiber reaches the target outer diameter, the optical fiber preform 4 is once again lowered, and the fiber-drawing speed is accelerated to a set line speed. The speed at which the optical fiber preform 4 is lowered at this time is set at from 0.2 mm/min to 5 mm/min, and the acceleration rate is set to from 50 m/min$^2$ to 150 m/min$^2$.

Once the fiber-drawing speed has reached the set speed, and the outer diameter of the bare optical fiber has reached the target outer diameter and is in a stable and stationary state, the drawn bare optical fiber is guided to a coating apparatus and a coating layer is formed thereon. As a result, an optical fiber is formed and is wound onto a reel. Note that the formation of the coating layer is performed from the very first fiber drawing.

In this manufacturing method, because the heat capacities of the conical portion 2a of the dummy tube 2 and the tapered portion 1a of the quartz tube 1 are mutually different, it is more difficult for the tapered shape of the tapered portion 1a to change compared with the conical portion 2a, and a longer time is required for such a deformation. Because of this, it is necessary for the lowering of the optical fiber preform 4 to be suspended and to be placed on standby for the length of time required for this deformation. If the lowering of the optical fiber preform 4 is not placed on standby, but is instead continued, then the effects of delayed deformation appear, and the outer diameter of the bare optical fiber becomes thicker so that even if the optical fiber preform 4 is lifted up after that, it is not possible for it to match the speed at which the outer diameter of the bare optical fiber becomes thicker, and it becomes impossible to make the outer diameter of the bare optical fiber thinner, so that there is a possibility of the bare optical fiber becoming blocked in the die of the coating apparatus and being broken.

Because of this, when the weld portion of the optical fiber preform 4 has reached the vicinity of the central position 11A of the heater 11, by suspending the lowering of the optical fiber preform 4, and causing the tapered shape of the vicinity of the weld portion to be deformed, and then waiting for delayed deformation to occur, it is possible to deal with variations in the outer diameter of the bare optical fiber by utilizing subsequent lifting operations of the optical fiber preform 4, and the speed can be accelerated without causing the optical fiber preform to break.

Regarding the acceleration rate before and after the lowering of the optical fiber preform 4 is suspended, it is necessary for the acceleration rate when the speed is being accelerated to be from 20 m/min$^2$ to 50 m/min$^2$ during the first lowering (i.e., before the lowering has been suspended), and to be from 50 m/min$^2$ to 150 m/min$^2$ during the second lowering (i.e., after the lowering has been suspended).

If the acceleration rate during the first lowering is too fast, the deformation of the distal end of the optical fiber preform does not occur in time and the outer diameter of the bare optical fiber becomes thinner while the speed is being accelerated. In the worst case, the bare optical fiber is not able to withstand the fiber-drawing tensile force which increases in conjunction with the acceleration, and may end up breaking. In contrast, if the acceleration rate is too slow, too much time is required for the final acceleration which is not desirable in consideration of the productivity and the yield.

Regarding the second lowering, as a result of the distal end of the optical fiber preform having already been deformed, a tendency is evident for the outer diameter of the bare optical fiber to become gradually thicker. Consequently, by increasing the acceleration rate, it is possible to both shorten the acceleration time and also confine the outer diameter of the bare optical fiber to a suitable range.

In other words, when the acceleration rate is too slow, the outer diameter of the bare optical fiber becomes too thick, and it becomes necessary to make the bare optical fiber narrower by again lifting up the delivery or the like. Once the speed has been accelerated to the final set line speed, it becomes necessary after all to once again lower the delivery, with the result that there is an increase in the amount of unnecessary labor. Moreover, it is also not preferable for the acceleration rate to be too fast, as this causes the outer diameter of the bare optical fiber to be too thin.

Regarding the lowering speed of the optical fiber preform 4 while the speed is being accelerated, it is necessary for the lowering speed to be from 5 mm/min to 20 mm/min during the first lowering, and to be from 0.2 mm/min to 5 mm/min during the second lowering.

If the first lowering speed is too slow, it is not possible to speed up the acceleration rate. This causes the length of time the speed is being accelerated to be too long. If, however, the lowering speed is too fast, then not only does the outer diameter of the bare optical fiber become too thick, but the deformation of the distal end of the preform does not occur in time. Consequently, a comparatively thick portion ends up being positioned in the center of the heating furnace heater. As a result of this, the temperature of the optical fiber preform 4 is lowered and the viscosity is raised, so that there is a marked increase in the fiber-drawing tensile force. In the worst case, there is a possibility that the bare optical fiber may end up breaking. By setting the lowering speed to from 5 mm/min to 20 mm/min, the elapsed time until the delivery is suspended is appropriate, and the fiber forming tensile force does not rise too drastically, while the acceleration period is also within an appropriate range.

In the same way, during the second lowering, because the distal end of the optical fiber preform has already been deformed, it is not necessary to increase the lowering speed. Consequently, it is desirable, conversely, to maintain the lowering speed on the slow speed side. If the lowering speed is too fast, the outer diameter of the bare optical fiber becomes too thick, which is undesirable. If the lowering speed is too slow, the preform supply rate is insufficient when the set line speed is reached so that the outer diameter of the bare optical fiber becomes too thin, which is also undesirable.

According to this method of manufacturing an optical fiber preform, even if an optical fiber preform having a portion where the heat capacities of the quartz tube 1 and the dummy tube 2 are mutually different is used for the optical fiber preform, superior fiber drawing is still possible. In addition, the time required from when the fiber-drawing task is started until a stationary state is achieved is shortened, and the unusable drawn wire portion that cannot be utilized as a product is reduced.

Specific examples are given below.

EXAMPLE 1

The distal end of a quartz tube having an outer diameter of ϕ180 mm and an inner diameter of ϕ50 mm was ground into a tapered shape such that the outer diameter of the distal end of the quartz tube was ϕ80 mm. A dummy tube having an outer diameter of ϕ80 mm and an inner diameter of ϕ40 mm was welded onto this distal end portion. Heat was then applied thereto so that the tapered shape was heated and stretched, and the distal end was then sealed off. At this time, the length from the distal end of the dummy tube to the weld portion was set at 100 mm. Next, a core rod having an outer diameter of ϕ45 mm was fitted inside the quartz tube so as to form an optical fiber preform. In this case, (the dummy tube outer diameter−the tapered portion distal end outer diameter)=0 mm.

The optical fiber preform was then set in a fiber-drawing furnace such that the distal end portion of the preform was positioned in the center of the furnace (i.e., in a reference position), and fiber drawing was then commenced. During the fiber drawing, the interior of the quartz tube was placed under negative pressure. The speed was accelerated such that the final conditions for the fiber drawing were: a fiber-drawing line speed of 1500 m/min and a starting line speed of 50 m/min.

The lowering speed at the point when the speed was begun to be accelerated was 20 mm/min, while the acceleration rate was 20 m/min$^2$. Thereafter, when the preform was lowered by 100 mm relative to the reference position, the lowering was suspended. Subsequently, when the acceleration was continued at the same acceleration rate, the outer diameter of the bare optical fiber exhibited a gradually narrowing trend.

Next, when the speed was increased to the vicinity of a line speed of 400 m/min, the outer diameter of the bare optical fiber gradually changed to a thickening trend. Thereafter, when the outer diameter of the bare optical fiber reached 137.5 μm, the optical fiber preform was lifted up 20 mm, and when the outer diameter of the bare optical fiber reached 112.5 μm, the lowering speed was set to 0.2 mm/min and the second lowering was started with the acceleration rate set to 100 m/min$^2$. Subsequently, the fiber-drawing speed reached the set line speed, namely, 1500 m/min, without any line breakages occurring. After becoming stable, the manufacturing of a high-quality optical fiber wire was begun.

The conditions for the line drawing of Examples and Comparative examples that were conducted in the same way, as well as the results, are shown in Tables 1 and 2. The results are considered below.

TABLE 1

| Example | Quartz tube outer diameter [mm] | Quartz tube inner diameter [mm] | Quartz tube tapered portion outer diameter [mm] | Dummy tube outer diameter [mm] | Dummy tube inner diameter [mm] | Distance from dummy tube distal end to weld portion [mm] | Core rod outer diameter [mm] | Length of fed preform when delivery was suspended [mm] | Central position relative to heater length [%] |
|---|---|---|---|---|---|---|---|---|---|
| Example 1 | 180 | 50 | 80 | 80 | 40 | 100 | 45 | 100 | 0 |
| Example 2 | 100 | 40 | 60 | 65 | 30 | 60 | 35 | 70 | 10 |
| Example 3 | 140 | 45 | 70 | 72 | 35 | 80 | 40 | 70 | −10 |
| Comparative example 1 | 180 | 50 | 80 | 80 | 40 | 100 | 45 | 120 | 20 |
| Comparative example 2 | 180 | 50 | 80 | 80 | 40 | 100 | 45 | 80 | −20 |
| Comparative example 3 | 180 | 50 | 80 | 70 | 40 | 100 | 45 | 100 | 0 |
| Comparative example 4 | 180 | 50 | 80 | 90 | 40 | 100 | 45 | 100 | 0 |
| Comparative example 5 | 140 | 45 | 70 | 72 | 35 | 80 | 40 | 70 | −10 |
| Comparative example 6 | 140 | 45 | 70 | 72 | 35 | 80 | 40 | 70 | −10 |
| Comparative example 7 | 100 | 40 | 60 | 65 | 30 | 60 | 35 | 70 | 10 |
| Comparative example 8 | 100 | 40 | 60 | 65 | 30 | 60 | 35 | 70 | 10 |
| Comparative example 9 | 180 | 50 | 80 | 80 | 40 | 100 | 45 | 100 | 0 |
| Comparative example 10 | 180 | 50 | 80 | 80 | 40 | 100 | 45 | 100 | 0 |

TABLE 2

| | Bare optical fiber outer diameter immediately before delivery is lifted [μm] | Amount of delivery lift [mm] | Bare optical fiber outer diameter after delivery is lifted [μm] | Before delivery is suspended | | After delivery has been suspended | | Result when acceleration occurred during delivery operation |
|---|---|---|---|---|---|---|---|---|
| | | | | Delivery speed [mm/min] | Rate of acceleration [m/min²] | Delivery speed [mm/min] | Rate of acceleration [m/min²] | |
| Example | | | | | | | | No problems |
| Example 1 | 137.5 | 20 | 112.5 | 20 | 20 | 0.2 | 100 | No problems |
| Example 2 | 145 | 15 | 100 | 5 | 50 | 5 | 150 | No problems |
| Example 3 | 150 | 10 | 105 | 10 | 30 | 2 | 50 | No problems |
| Comparative example 1 | 140 | Fiber broken | | 20 | 20 | Fiber broken | | No problems before suspension |
| Comparative example 2 | 125 | 5 | 100 | 20 | 20 | | | No problems before suspension |
| Comparative example 3 | Fiber broken | | | 20 | 20 | | | No problems before suspension |
| Comparative example 4 | | | | 20 | 20 | | | No problems before suspension |
| Comparative example 5 | 165 | Fiber broken | | 10 | 30 | — | | No problems before suspension |
| Comparative example 6 | 125 | 5 | 105 | 10 | 30 | Fiber broken | | No problems before suspension; Fiber became too thick and was broken after suspension and during acceleration |
| Comparative example 7 | | — | | 30 | 70 | — | | Tensile force too great before suspension so fiber was broken |
| Comparative example 8 | | — | | 2 | 10 | — | | Acceleration time was too long: unacceptable decrease in operating efficiency |
| Comparative example 9 | 137.5 | 20 | 112.5 | 20 | 20 | 8 | 200 | No problems before suspension; Fiber became too thick and was broken after suspension and during acceleration |
| Comparative example 10 | 137.5 | 20 | 112.5 | 20 | 20 | 0.1 | 30 | No problems before suspension; Fiber became too thick and was broken after suspension and during acceleration |

Examples 1 to 3 show manufacturing methods that fall within the range of the claims of the present invention. The preform diameter φ was in a range of 100 to 180 mm, and the outer diameter of the dummy tube was within a range of 0 to 5 mm thicker than the outer diameter of the distal end of the tapered portion of the quartz tube. The amount by which the preform was lowered (=the position of the weld portion) when the lowering was suspended during acceleration was within a range of ±10% (when converted to heater length) relative to the center of the heater. Moreover, the lowering speed before the lowering was suspended was from 5 to 20 mm/min, and the acceleration rate was from 20 to 50 m/min². The lowering speed after the lowering was suspended was from 0.2 to 5 mm/min, and the acceleration rate was from 50 to 150 m/min². In this state, when the operation was on standby while the lowering was suspended, the standby state was maintained until the diameter of the bare optical fiber became gradually thicker. Thereafter, the optical fiber preform was temporarily lifted up. It was found that, by performing the above-described manufacturing process, it was possible to maintain acceleration until the set line speed was reached without the optical fiber becoming broken during the acceleration.

Next, examples having unsuitable acceleration conditions are shown in Comparative examples 1 to 10. Specifically, Comparative examples 1 and 2 show cases in which the amount by which the preform was fed was not within a range of ±10% relative to the center of the heater at the time when the delivery of the preform was suspended, while Comparative examples 3 and 4 show cases in which the outer diameter of the dummy tube was not within a range of 0 to 5 mm relative to the outer diameter of the taper-worked portion of the quartz tube.

If the position of the weld portion when the lowering was suspended was not within a range of ±10% relative to the center of the heater, then if the position of the weld portion when the lowering was suspended was greater than +10% relative to the center of the heater, because the melting started from the top portion of the weld portion in the distal end portion of the optical fiber preform, the effect resulting from the heat capacity of the weld portion being different was considerable. As a result, the outer diameter of the bare optical fiber became abruptly thicker, and even when the optical fiber preform was lifted up immediately thereafter, it was still too late to make the outer diameter of the bare optical fiber more narrow, and it became blocked in the die during the coating process and in the nipple holes and the like and ended up breaking.

In contrast, when the position of the weld portion when the lowering was suspended was less than −10% relative to the center of the heater, because only the area below the weld portion was melted, it became difficult for the weld portion to be deformed. As a consequence, there were no instances of the outer diameter of the bare optical fiber becoming gradually thicker. Thereafter, when the lowering was again commenced, the effects of deformation of the weld portion did once again become evident, and the outer diameter of the bare optical fiber became rapidly thicker, so that the bare optical fiber became blocked in the coating apparatus and ended up breaking, which was an undesirable outcome.

Meanwhile, when the outer diameter of the dummy tube was outside a range of 0 to 5 mm relative to the outer diameter of the taper-worked portion of the quartz tube, firstly, when the outer diameter of the dummy tube was smaller than the outer diameter of the quartz tube tapered portion (i.e., if it was less than 0), then it was easy for the step portion of the outwardly bulging tapered portion of the quartz tube to be left remaining. Because of this, the outer diameter of the bare optical fiber became immediately thicker, and this thicker portion also became blocked in the coating apparatus and caused the fiber to break. Moreover, when the diameter of the dummy tube was more than 5 mm larger than the outer diameter of the distal end of the tapered portion of the quartz tube, conversely, the diameter of the bare optical fiber became abruptly narrower and was not able to withstand the tensile force applied thereto during fiber drawing, and ended up being broken. Naturally, this was undesirable.

Comparative examples 5 and 6 show cases in which the outer diameter of the bare optical fiber was not within a range of 10 to 20% immediately before the delivery was lifted up while the delivery was still suspended. When the outer diameter of the bare optical fiber was more than 20%, that meant that deformation of the weld portion while on standby was currently progressing, and even when the optical fiber preform was abruptly lifted up after that, it was still not in time to make the outer diameter of the bare optical fiber more narrow, and it became blocked in the die during the coating process and in the nipple holes and the like and ended up breaking.

In contrast, when the outer diameter was less than 10%, the deformation of the weld portion was insufficient. Consequently, during the subsequent second delivery lowering and acceleration, the effects of deformation of the weld portion did once again become evident, and the outer diameter of the bare optical fiber became rapidly thicker, so that the bare optical fiber became blocked in the coating apparatus and ended up breaking, which was an undesirable outcome.

Comparative examples 7 and 8 show cases in which the delivery speed and the acceleration rate prior to the delivery being suspended were not within a range of 5 to 20 mm/min and 20 to 50 m/min$^2$ respectively. Comparative examples 9 and 10 show cases in which the delivery speed and the acceleration rate after the delivery was suspended were not within a range of 0.2 to 5 mm/min and 50 to 150 m/min$^2$ respectively.

When the delivery speed and the acceleration rate prior to the delivery being suspended were more than 20 mm/min and 50 m/min$^2$ respectively, then the deformation of the whole tapered portion including the weld portion during the acceleration prior to the delivery being suspended was not in time, and the temperature of the preform distal end portion was too cool resulting in increased viscosity. As a consequence, there was an increase in the fiber forming tensile force and the fiber ended up being broken, which was an undesirable outcome.

In contrast, when the delivery speed and the acceleration rate prior to the delivery being suspended were less than 5 mm/min and 20 m/min$^2$ respectively, then it took too much time for the weld portion to reach the center of the heater (in Comparative example 8, a simple calculation gave a time of 35 minutes for this movement), and the acceleration also took too much time. Accordingly, there was a poor balance between the time taken for the weld portion to reach the center of the heater and the line speed, so that there was insufficient progress in the deformation of the weld portion, and the overall time taken was too long, which was an undesirable outcome.

When the delivery speed and the acceleration rate after the delivery was suspended were more than 5 mm/min and 150 m/min$^2$ respectively, the outer diameter of the bare optical fiber during the second acceleration after the delivery had been stopped was too thick, so that the bare optical fiber became blocked in the coating apparatus and ended up breaking, which was an undesirable outcome.

When, on the other hand, the delivery speed and the acceleration rate after the delivery was suspended were less than 0.2 mm/min and 50 m/min$^2$ respectively, in the same way, the deformation of the weld portion progressed and it was not possible to maintain the thinness of the bare optical fiber which had become naturally thicker due to the slow acceleration rate. The bare optical fiber consequently was too thick and became blocked in the coating apparatus and ended up breaking, which was an undesirable outcome.

As has been described above, the balance between the delivery speed and the acceleration rate both before the delivery is suspended and after the delivery has been suspended is of the utmost importance. If this balance is lost, then the balance between the deformation of the weld portion and the outer diameter of the bare optical fiber is also lost, and this leads to fiber breakages and the like.

What is claimed is:

1. A method of manufacturing an optical fiber using an optical fiber preform, the method comprising:

placing a distal end of a conical portion of the optical fiber preform in a central position in a vertical direction of a heater of a heating furnace of a fiber-drawing apparatus, the optical fiber preform comprising a tapered portion that is formed by grinding an outer circumferential portion of a distal end portion of a quartz tube into a tapered shape; the conical portion that is formed by welding a dummy tube to the distal end portion of the tapered portion, and by applying heat to the dummy tube and stretching out the dummy tube, wherein a difference between an outer diameter of the dummy tube and an outer diameter of the distal end portion of the tapered portion is from 0 mm to 5 mm; and a core rod inserted into the quartz tube;

starting fiber-drawing after placing the distal end of the conical portion of the optical fiber preform in the central position and withdrawing a bare optical fiber which is heated and melted from the distal end of the conical portion;

at the same time as the fiber drawing is started, lowering the optical fiber preform at a lowering speed of between 5 mm/min and 20 mm/min and accelerating a speed of the fiber-drawing at a rate of acceleration of between 20 m/min$^2$ and 50 m/min$^2$;

once a weld portion where the quartz tube is welded to the dummy tube has reached a range relative to the central position of between +10% and −10% of a length of the heater, suspending the lowering until the tapered shape in a vicinity of the weld portion is deformed;

continuing the fiber drawing while the speed is accelerated at the same acceleration rate even while the lowering of the optical fiber preform is suspended;

after the fiber drawing is continued until an outer diameter of the bare optical fiber reaches 10 to 20% thicker with respect to a target outer diameter, temporarily lifting up the optical fiber preform;

when the outer diameter of the bare optical fiber reaches the target outer diameter by adjusting the outer diameter of the bare optical fiber so as to be narrower, resuming the lowering of the optical fiber preform at a lowering speed of between 0.2 mm/min and 5 mm/min; and accelerating the fiber drawing speed at a rate of acceleration of between 50 m/min$^2$ and 150 m/min$^2$ until the fiber drawing speed reaches a set line speed.

* * * * *